Dec. 9, 1930.   P. D. FLEHR   1,784,228
FREQUENCY CONVERTER
Filed July 20, 1926   2 Sheets-Sheet 1
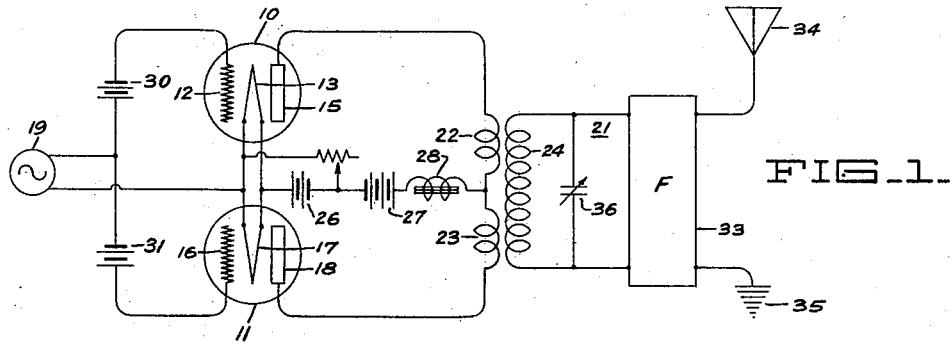
FIG_1_
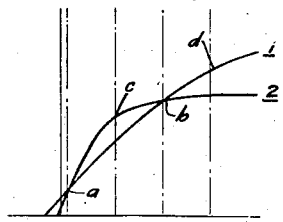
FIG_2_
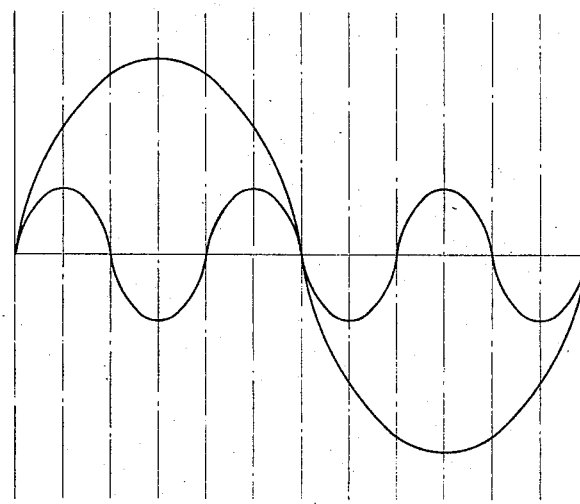
FIG_3_
INVENTOR
Paul D. Flehr Dec. 9, 1930.  P. D. FLEHR  1,784,228
FREQUENCY CONVERTER
Filed July 20, 1926  2 Sheets-Sheet 2
FIG_4_
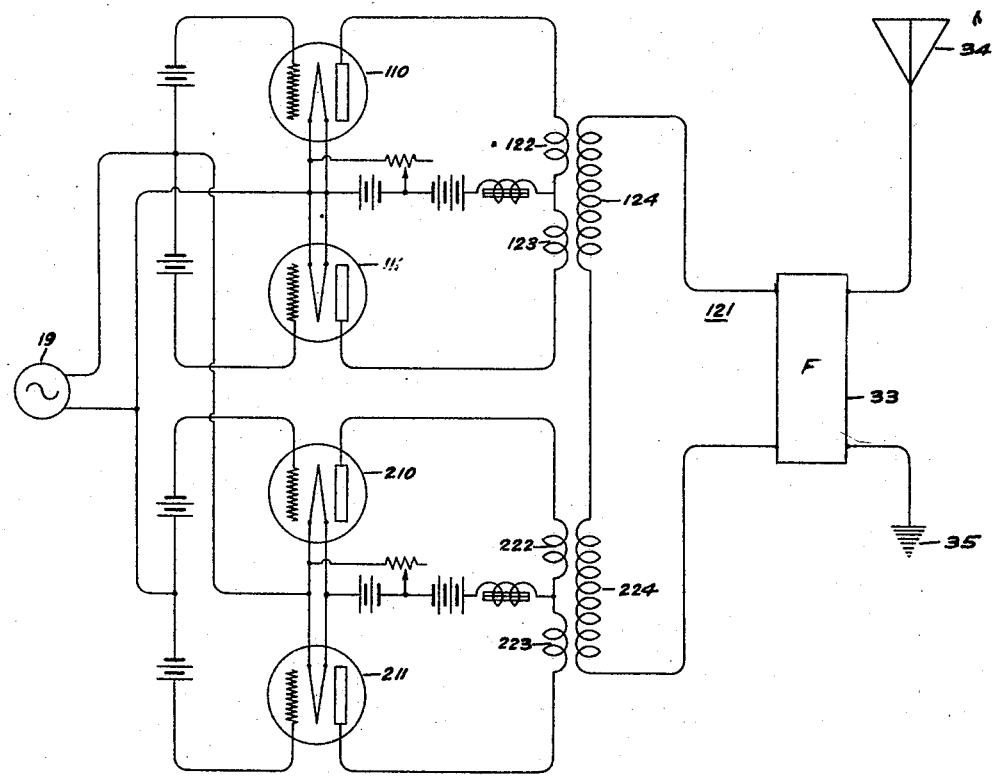
INVENTOR Patented Dec. 9, 1930

1,784,228

UNITED STATES PATENT OFFICE

PAUL D. FLEHR, OF SAN FRANCISCO, CALIFORNIA

FREQUENCY CONVERTER

Application filed July 20, 1926. Serial No. 123,695.

This invention relates generally to devices for changing the wave form or for converting the frequency of an alternating current.

In the past, frequency converters have been constructed with relatively moving parts so that they have been inherently of complicated and expensive construction. While converters of this kind may be successfully employed for systems having a relatively high kilowatt output, they have not been practical for installations where relatively low currents are employed. Furthermore it has not been possible to use such converters for high frequency or radio frequency currents.

It is an object of this invention to devise a frequency converter which will obviate the use of all moving parts.

It is a further object of this invention to devise a converter which will operate efficiently upon radio frequencies.

Further objects of the invention will appear from the following description in which I have set forth the preferred embodiment of my invention. It is to be understood that the invention is only to be limited as defined by the appended claims and the state of the prior art.

Referring to the drawings:

Figure 1 is a circuit diagram illustrating diagrammatically one embodiment of my invention.

Fig. 2 illustrates by curves the characteristics of two repeater elements which may be employed with this invention.

Fig. 3 illustrates by curves the manner in which the device converts the frequency of an alternating current.

Fig. 4 is a modification of the invention in which both half cycles of the alternating current are converted to a higher frequency.

The invention comprises generally a plurality of repeater or amplifier elements having their inputs connected in parallel and their outputs connected in series so as to act differentially upon each other. The amplifier elements are so selected that their characteristics are different, thus making possible a differential current in the output circuit which differs in wave form and frequency from the exciting current. Electron emission tubes are preferably used for the amplifier or repeater elements so that the device may operate efficiently for either high or low frequencies.

Referring to Fig. 1, there is shown a pair of repeater elements in the form of electron emission tubes 10 and 11, tube 10 having the usual grid 12, electron emission element 13 and plate 15, while tube 11 is provided with similar elements 16, 17 and 18, respectively. The input circuit of each tube is preferably connected in parallel with an exciting source of alternating current such as an alternator or alternating current generator 19.

To form an output circuit for the two tubes the plates 15 and 18 are preferably connected in series and this series circuit is coupled to a suitable work circuit 21. Thus, for example, a pair of inductance coils 22 and 23 may be inserted in series with the plates 15 and 18, these inductances being coupled to a suitable secondary inductance coil or secondary 24 supplying the work circuit 21. As a source of energy for the system a suitable "A" battery 26 may be provided for the electron emission elements 13 and 17, and a suitable "B" battery 27 for placing a positive potential upon the plates 15 and 18. Preferably the "B" battery 27 has its negative terminal connected to the electron emission element and its positive terminal connected at the mid point between the primary inductances 22 and 23. A suitable choke 28 may be inserted between the "B" battery and the inductances 22 and 23 to prevent by-passing of radio frequency current.

With the above arrangement if the two electron emission tubes 10 and 11 have similar characteristics, then for a given exciting potential upon the two grids 12 and 16, the current in the respective output circuits for the tubes 10 and 11 will be equal and opposite with the result that the fields of coils 22 and 23 will exactly balance each other. However, if the repeater or amplifier characteristics are not identical then for certain values of exciting potential the respective output currents will be different, with the result that a differential magnetic field will be produced by the combined effects of coils 22 and 23. By selecting tubes of different characteristics it is possible to either simply modify the wave form of the exciting current or to convert its frequency to a multiple of the frequency of the exciting current.

In Fig. 2 for example, there has been shown characteristic curves 1 and 2 which intersect at a plurality of points $a$ and $b$. These curves are plotted against a grid potential upon the horizontal axis and plate current on the vertical axis. Between the points $a$ and $b$ the curves are separated apart, showing that for certain values of grid potential a differential effect will occur between the two tubes. Similarly for values of grid potential greater than that corresponding to point $b$ the curves are also divergent. Now if two tubes were made to operate so that the potential change caused by one-half cycle will vary the grid potential between the points $a$ and $b$, then for at least two values of the grid potential corresponding to points $a$ and $b$ the resultant fields of coils 22 and 23 will be zero, while for point $c$ intermediate the points $a$ and $b$, and for point $d$ there will be a differential field set up caused by the combined action of coils 22 and 23.

Preferably point $a$ corresponds to zero exciting potential so that it is necessary to apply a suitable C battery potential to the grids 12 and 16. Thus C batteries 30 and 31 have been inserted in series with the grids 12 and 16 respectively, which in this particular instance apply positive potential to the grids 12 and 16. For a full one-half cycle of the exciting potential the resultant differential field of coils 22 and 23 will vary from an initial zero value at point $a$ to a maximum at point $b$ and then to a zero again at point $b$, after which it will again vary to a maximum at point $d$. As the potential falls again to zero the differential field will fall from a maximum to zero at point $b$, will rise again to a maximum at point $c$ and then will drop back to zero at point $a$. The result will be that for one-half cycle of the exciting potential one and a half cycles of output current will be induced in the secondary 24, as indicated in Fig. 3. However, since electron emission tubes are unidirectional devices, the arrangement shown in Fig. 1 will only convert the frequency of one-half of the cycle of the exciting potential.

In Fig. 4 there is shown a practical arrangement for converting the frequency of both cycles of the exciting potential. In this arrangement one set of tubes 110 and 111 are employed for converting the frequencies of one-half cycle, and another set 210 and 211 employed for converting the frequencies of the other half cycle, the two output circuits of the two sets of tubes being connected together and to a common work circuit. Thus one side of the oscillator 19 is connected to the grids of one set of tubes and to the electron emission elements of the other set, while the other side of the oscillator is connected to the electron emission elements of the first set and to the grids of the second set of tubes. The primary coils of the two sets 122 and 123 and the coils 222 and 223 of the other set may be adapted to induce current in separate secondary coils 124 and 224 which may be connected in series to a common work circuit 121. The operation of the arrangement is of course identical with that of the system shown in Fig. 1 with the exception that full cycle conversion is effected.

The system has special application in radio frequency currents since no moving parts or magnetic iron cores need be employed. Thus as shown in both Figs. 1 and 4, the work circuit has been shown as connected to a suitable filter 33 supplying an antenna 34 and ground 35 for signaling at radio frequency. If desired, the secondary coils may be tuned by means of the variable condenser 36.

With the system as described above, frequencies three times the frequency of the exciting potential will be produced in the work circuit. Frequencies greater than this may be obtained either by using a cascade arrangement of frequency converter tubes, or by reflexing a converted frequency back into the input circuits of the tubes.

I claim:

1. A device for converting pulsating current of one frequency to pulsating current of another frequency comprising at least two electron relays having different characteristic curves, means for connecting their inputs to a common exciting source of current and means for coupling their outputs to differentially affect a work circuit.

2. In a repeating system, at least two electron relays, an input circuit for exciting both said relays, a common work circuit into which current variations affected differentially by said relays are repeated, said relays having characteristic curves which intersect at at least two spaced points within their normal range of operation.

3. An electrical network comprising an input circuit adapted to be excited with alternating current, means including an overloaded electron relay for distorting the wave form of each positive half cycle of current in the input circuit, and means including another overloaded electron relay for distorting each negative half cycle of current in the input circuit, and a common output circuit supplied by both said means.

4. A frequency converter comprising an input circuit adapted to be excited with alternating current, an output circuit, and means comprising a plurality of electron relays imposed between said circuit in push-pull relationship, said relays having different repeating characteristics.

5. A device for converting pulsating current of one frequency to curent of another frequency comprising at least two one way relays having their inputs connected to a common source of exciting current, and having their output arranged to differentially affect a work circuit, said relays having different characteristic repeating curves.

6. The method of changing the wave form of an elctrical current characterized by the use of an input circuit excited by single phase oscillatory current, electron relay means connected to said circuit, a work circuit having a coupling to the output of said electron relay means, and means for energizing said electron relay means including a local source of current which is independent of the current variations in the input circuit; said method comprising causing the electron relay means to control flow of current from said source thru said coupling in opposite senses for one impulse of one polarity in the input circuit, and causing said current flow thru said coupling to effect a plurality of impulses of opposite polarity in the work circuit for said impulse of one polarity in the input circuit.

In testimony whereof, I have hereunto set my hand.

PAUL D. FLEHR.